United States Patent
Lokenberg Dixon et al.

(10) Patent No.: US 7,499,599 B2
(45) Date of Patent: Mar. 3, 2009

(54) METHOD OF REAL-TIME CORRECTION OF NON-FUNCTIONING PIXELS IN DIGITAL RADIOGRAPHY

(75) Inventors: Elizabeth Lokenberg Dixon, Delanson, NY (US); Walter Vincent Dixon, Delanson, NY (US); Clifford Bueno, Clifton Park, NY (US); Gregory Alan Mohr, Scotia, NY (US); Brian Walter Lasiuk, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 853 days.

(21) Appl. No.: 10/461,053

(22) Filed: Jun. 12, 2003

(65) Prior Publication Data

US 2004/0252910 A1    Dec. 16, 2004

(51) Int. Cl.
*G06K 9/40* (2006.01)
*G06K 1/00* (2006.01)
*H04N 5/00* (2006.01)
*H04N 1/60* (2006.01)
*H04N 1/40* (2006.01)
*G06F 15/00* (2006.01)

(52) U.S. Cl. .................. 382/275; 382/254; 348/606; 348/624; 358/1.9; 358/3.31; 358/447; 358/461; 358/463

(58) Field of Classification Search .................. 382/275, 382/274, 254; 348/606–624; 358/1.9–3.31, 358/447, 461, 463
See application file for complete search history.

(56) References Cited

U.S. PATENT DOCUMENTS 5,150,429 A * 9/1992 Miller et al. ................. 382/275

| | | | |
|---|---|---|---|
| 6,296,387 B1 | 10/2001 | Guillemaud | |
| 6,470,071 B1 | 10/2002 | Baertsch et al. | ................ 378/62 |
| 6,504,895 B1 | 1/2003 | Dixon et al. | .................. 378/19 |
| 6,526,366 B1 | 2/2003 | Dunton | |

(Continued)

FOREIGN PATENT DOCUMENTS

| WO | 0127688 | | 1/2001 |
|---|---|---|---|
| WO | WO 01/27688 | * | 4/2001 |

OTHER PUBLICATIONS

JP2001008928, R. Aufrichtig et al., Jan. 16, 2001, Patent Abstract.
Partial European Search Report, EP 04253496, Sep. 10, 2004.
EP Search Report, EP06012032, Jul. 18, 2006.

*Primary Examiner*—Matthew C Bella
*Assistant Examiner*—Randolph Chu
(74) *Attorney, Agent, or Firm*—Penny A. Clarke

(57) ABSTRACT

A method and program product for real-time correction of non-functioning pixels in digital radiography, where the method comprises: receiving a list of non-functioning pixels; determining which neighboring functioning pixels are needed to correct the non-functioning pixels; organizing those neighboring functioning pixels and corresponding non-functioning pixels into a plurality of groups by a number of pixels used to perform correction; and performing correction of data from non-functioning pixels within one of the plurality of groups and subsequently performing correction of data from non-functioning pixels within another one of the plurality of groups. Also, a method and program product for producing an accurate real-time map of non-functioning pixels in a detector panel for digital radiography, where the method comprises: determining a first list of non-functioning pixels found using an extended exposure mode of the detector panel; determining a second list of non-functioning pixels found using a real-time mode of the detector panel; and merging the first and second lists into a merged list of non-functioning pixels for the detector panel.

20 Claims, 1 Drawing Sheet

U.S. PATENT DOCUMENTS

| | | | |
|---|---|---|---|
| 6,661,456 B1 | 12/2003 | Aufrichtig et al. | 348/247 |
| 6,879,324 B1* | 4/2005 | Hoppe | 345/423 |
| 2001/0036305 A1* | 11/2001 | Jun | 382/149 |
| 2002/0196354 A1 | 12/2002 | Chang et al. | |
| 2003/0011794 A1* | 1/2003 | Yao et al. | 358/1.9 |
| 2003/0058998 A1 | 3/2003 | Aufrichtig et al. | |
| 2003/0063203 A1 | 4/2003 | Ohno | |
| 2003/0226984 A1 | 12/2003 | Iwakiri | |

* cited by examiner

METHOD OF REAL-TIME CORRECTION OF NON-FUNCTIONING PIXELS IN DIGITAL RADIOGRAPHY

BACKGROUND OF THE INVENTION

In digital radiography applications, non-functioning pixels of the digital detector, and particularly groups of non-functioning pixels, can create areas of anomalous gray value that appear brighter or darker than surrounding pixels on the displayed images and serve to distract the user. Therefore, it is important to be able to identify any non-functioning pixels and correct the corresponding gray values in the displayed images.

Performing such identification and correction is particularly difficult in real-time digital radiography applications. Processing large-format digital detector data to produce images in real time at 30 million pixels per second is computationally intensive. Accordingly, the identification of non-functioning pixels, and the subsequent correction of the anomalous digital data they produce, must be done with efficient usage of limited processor and memory resources. Current methods for performing non-functioning pixel correction result in significant processing times that might limit the speed of the system, and/or result in reduced image quality due to poor identification and correction algorithms. There is a need for such identification and correction to be done more quickly than in existing systems. In addition, there is a need to be able to more accurately identify pixels as being non-functioning.

SUMMARY OF THE INVENTION

The present invention addresses the problems identified by the inventors and organizes the non-functioning pixels and functioning pixels used to correct the non-functioning pixels in a way which makes efficient use of a processor's cache and which reduces branch mispredictions. The present invention also provides a method of accurately identifying non-functioning pixels.

Specifically, the present invention provides a method and program product for real-time correction of anomalous data from non-functioning detector pixels in digital radiography, where the method comprises: receiving a list of non-functioning pixels; determining which neighboring functioning pixels are needed to correct the non-functioning pixels; organizing those neighboring functioning pixels and corresponding non-functioning pixels into a plurality of groups by a number of pixels used to perform correction; and performing correction of non-functioning pixels within one of the plurality of groups and subsequently performing correction of non-functioning pixels within another one of the plurality of groups.

The present invention also provides a method and program product for producing an accurate real-time map of non-functioning pixels in a detector panel for digital radiography, where the method comprises: determining a first list of non-functioning pixels found using a long exposure mode of the detector; determining a second list of non-functioning pixels found using a real-time exposure mode of the detector; and merging the first and second lists into a merged list of non-functioning pixels for the detector when operated in the real-time mode.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawing, where.

DETAILED DESCRIPTION OF THE INVENTION

Figure 1:
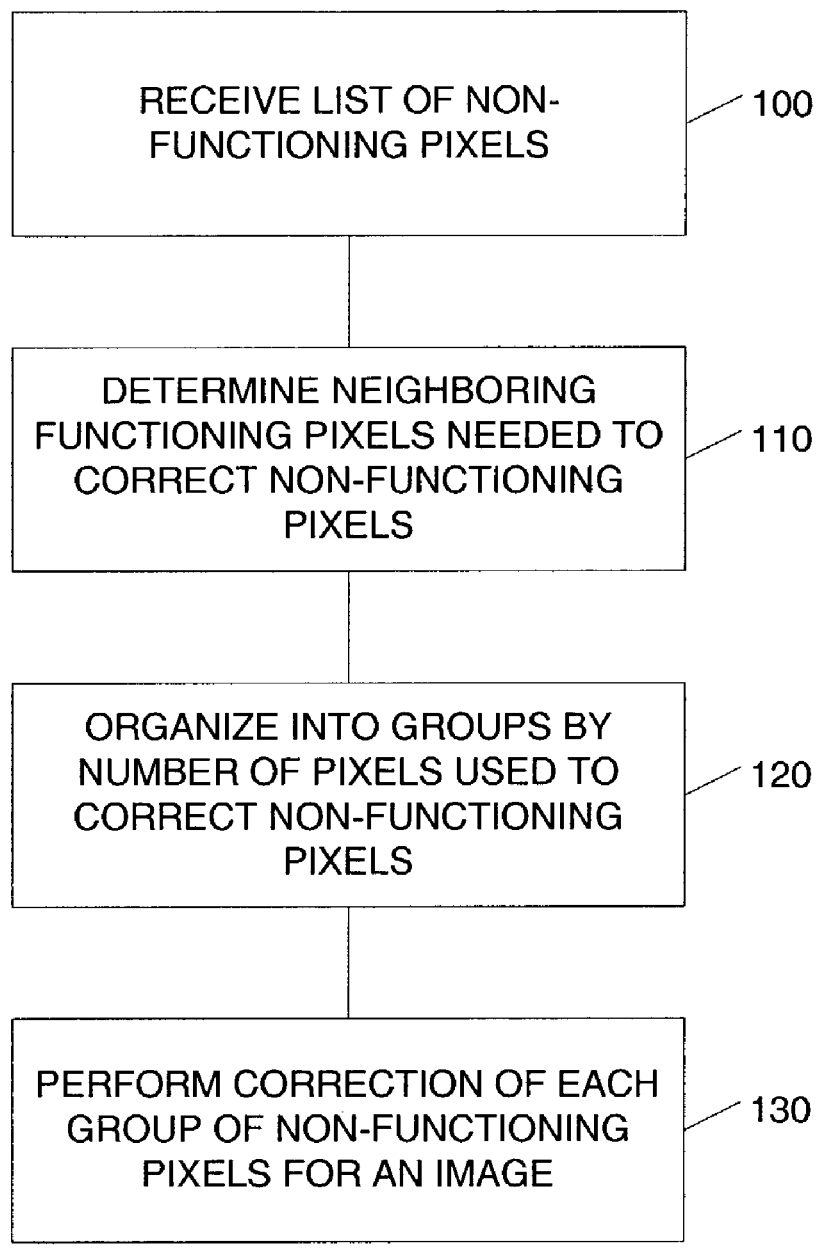
FIG. 1 illustrates a method of real-time correction of non-functioning pixels in accordance with a preferred embodiment of the present invention.

The invention is described below with reference to the drawing. The drawing illustrates certain details of a specific embodiment that implements the method of the present invention. However, describing the invention with drawing should not be construed as imposing, on the invention, any limitations that may be present in the drawing. The present invention contemplates methods and program products on any computer readable media for accomplishing its operations. The embodiments of the present invention may be implemented using an existing computer processor, or by a special purpose computer processor incorporated for this or another purpose or by a hardwired system.

Referring now to FIG. 1, step 100 illustrates the initial step in the method of real-time correction of non-functioning pixels in digital radiography in accordance with a preferred embodiment of the invention. In the preferred embodiment of this method this step receives a binary map of functioning and non-functioning pixels and converts this binary map to a list of locations (row, column) of non-functioning pixels. In this embodiment of the invention the exact manner by which such a map is generated is not relevant. While any method can be used to generate the list that is received in step 100, a preferred method is described later herein.

Next, in step 110 the processor, having received a list of non-functioning pixels in an image, determines the neighboring functioning pixels needed to correct those non-functioning pixels. In this determination, the location of the non-functioning pixel determines which neighboring pixels will be reviewed in order to determine which of such neighboring pixels will be used to correct the non-functioning pixel. Preference is given to the pixels neighboring the non-functioning pixel on the left and right side, followed by those positioned above and below the non-functioning pixel, followed by those positioned diagonal to the non-functioning pixel, followed by those positioned more than one pixel away from the non-functioning pixel. The physical basis for this preference depends on the design of the digital X-ray sensor; thus left, right, up, and down assume a specific detector orientation. In the preferred embodiment of this invention, one specifies the correction strategies as a series of tables. The routine selecting the correction strategy iterates this table until it finds a strategy that will correct each non-functioning pixel. Only those neighboring pixels, which are functioning and have not been corrected themselves are considered.

The selected neighboring pixels will be weighted and combined to correct and in essence interpolate the non-functioning pixel. Weighting is related to the distance of the selected neighboring pixel from the non-functioning pixel being corrected. More than one neighboring pixel may be found to be useful in correcting the non-functioning pixel. For example, if both the pixel to the left and the pixel to the right of the non-functioning pixel are viable neighbors, they will both be used in order to correct the non-functioning pixel based on the current x-ray detector architecture and correction strategy. The result is that for all or substantially all of the non-functioning pixels in the list provided in step 100, the corresponding neighboring pixels, which can be used to correct the non-functioning pixels are determined.

Next, in step 120, the list of non-functioning pixels and corresponding functioning neighboring pixels are organized into one or more groups in accordance with the number of neighboring pixels that will be used to correct a non-functioning pixel. For example, all of the non-functioning pixels that require only one neighboring pixel to be used for correction are grouped together. Similarly, all of the non-functioning pixels that require two neighboring functioning pixels for correction are grouped together. As discussed herein, this grouping will allow for better branch prediction during correction. Furthermore, multiple groups can be combined under certain circumstances in order to reduce memory bandwidth requirements. For example, the group requiring only one neighboring pixel can be combined with the group requiring two neighboring pixels by duplicating the one pixel so that two neighboring pixels are provided for correction of each non-functioning pixel without changing the result. These two groups having been combined will result in fewer memory access operations during correction and also may reduce the number of cache misses.

Once the groups are organized, in step 130, correction of the non-functioning pixels of each of these groups is performed. That is, correction of each of the non-functioning pixels within a first group is performed and then a similar correction is performed for the non-functioning pixels of a subsequent group. This process is repeated until all of the groups of non-functioning pixels have been corrected. This makes branch prediction more likely since similar types of operations are grouped together. The correction itself can be performed by any number of methods known to those skilled in the art. In the preferred embodiment the correction of a non-functioning pixel is performed using a linear combination of the functioning neighboring pixels as determined in step 110.

Note that steps 100, 110 and 120 need only be performed on the first or a single image of an image sequence. Until the image detector device is recalibrated, the already determined non-functioning pixel list along with the corresponding functioning neighbor list can be used for each subsequent image. The locations of these pixels will not change; rather, only the data contained in the pixels will change. Step 130, however, would be performed for each of such images in a sequence.

The above described method of correcting non-functioning pixels in real time provides for more accurate branch prediction and fewer branch mispredictions. The processor uses branch prediction techniques in order to efficiently utilize its pipeline and to increase processing speed. When patterns can be discerned from the instructions, the processor can predict the direction of a branch and be able to start on the next operation in order to put it into the pipeline even though a previous or present operation is still under way. If the prediction is incorrect, however, there is a significant loss in processing time as up to a hundred "in-flight" instructions must be cancelled. Accordingly, under the present invention, the preventing of such branch mispredictions is valuable in improving overall processing speed and thus facilitating real-time correction of non-functioning pixels in digital radiography.

Furthermore, as mentioned above, by precomputing the list of locations both for the non-functioning pixels and the required neighboring functioning pixels the number of operations that must occur in real time is reduced. In addition, by merging groups that require a different number of functioning neighboring pixels to correct non-functioning pixels, the number of passes through the image data in the memory is reduced.

Under the present invention prefetching opportunities can be identified by scanning the list of non-functioning pixels and, during correction of other non-functioning pixels, starting to retrieve the necessary data on the neighboring pixels into the processor cache. Also, the non-functioning pixels can be ordered by memory address and then corrected in substantially the same order instead of in a random order so that the required information for correcting each subsequent pixel has likely already been retrieved into the cache. In another embodiment of the invention the list of non-functioning pixels is split and treated by multiple processor in order to further facilitate real-time correction of non-functioning pixels. In yet another embodiment of the invention, the image correction results can be simulated offline since steps 110, 111 and 120 need to be performed only once for a given image sequence. The simulation can predict whether combining two or more groups of pixels will decrease processing time. The simulation can also predict the best strategy for splitting the pixel correction task across multiple processors and assess the benefits of prefetching data.

In yet another embodiment of the invention, a method of producing an accurate real-time map of non-functioning pixels in a detector panel for digital radiography is provided and is described herein. This method is used in order to generate a list of non-functioning pixels from an image detector and can be provided to the previously described method in step 100 of FIG. 1. In accordance with this method, a first list of non-functioning pixels is determined using a long or extended exposure mode of detector panel. Then, a second list of non-functioning pixels is determined using a real-time mode of the same detector panel.

Both the extended exposure mode and the real-time mode are known to those skilled in the art to represent, respectively static and dynamic modes of digital radiography. The inventors have determined that a non-functioning pixel list generated using the extended exposure mode alone or the real-time mode alone did not accurately identify all of the anomalies in dynamic imagery. The inventors further identified in accordance with the present invention that a combination of the non-functioning pixel maps generated by using each of the modes would result in a merged list of non-functioning pixels that would be more accurate for use in correction in the real-time mode.

Accordingly, in the present invention, once the first list of non-functioning pixels found using an extended exposure mode is determined and a second list of non-functioning pixels found using a real-time mode is determined, these two lists are merged to create a merged list of non-functioning pixels for the detector panel for use in real-time mode. This merging preferably comprises a logical OR operation wherein, if a pixel is identified as non-functioning in either or both of the two modes, it is identified as non-functioning in the merged list of non-functioning pixels.

The map of non-functioning pixels in the extended exposure mode is determined by analyzing the detector data acquired at various x-ray intensities. This map is used to create the first list of non-functioning pixels found using the extended exposure mode described above. In the extended exposure mode, the x-ray conditions are varied from low to high intensity such that the pixel levels span the dynamic range of the detector.

The second list of non-functioning pixels, that is, the list generated using the real-time mode, is taken using x-ray conditions that produce images with low, medium and high intensity settings, but where each of these setting falls within a lower range than that used in the extended exposure mode. Any number of intensity settings are used, but three levels are used in the preferred embodiment. The merging of these two lists identifies a greater number of non-functioning pixels then either of the two lists alone for which this larger number is observed in un-corrected operation during dynamic imaging.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of real-time correction of non-functioning pixels in digital radiography, the method comprising: using a processor to perform the steps of
   receiving a list of non-functioning pixels;
   determining which neighboring functioning pixels are needed to correct said non-functioning pixels;
   organizing said neighboring functioning pixels and corresponding non-functioning pixels into a plurality of groups based on a number of functioning pixels used to perform said correction of said non-functioning pixels within at least one of said plurality of groups; and
   correcting data from said non-functioning pixels within one of said plurality of groups and subsequently correcting data from said non-functioning pixels within another one of said plurality of groups.

2. A method of real-time correction of non-functioning pixels in digital radiography according to claim 1 wherein said groups include a relative weight to be given to each of said neighboring functioning pixels in correcting the non-functioning pixels.

3. A method of real-time correction of non-functioning pixels in digital radiography according to claim 1 wherein said correction is performed sequentially by grouping said non-functioning pixels in each of said plurality of groups.

4. A method of real-time correction of non-functioning pixels in digital radiography according to claim 1 wherein said correction is performed for each image in a real-time image sequence.

5. A method of real-time correction of non-functioning pixels in digital radiography according to claim 1 wherein said step of determining which neighboring functioning pixels are needed to correct said non-functioning pixels further comprises determining that a functioning, non-corrected pixel is present in a neighboring position to a corresponding non-functioning pixel, said functioning, non-corrected pixel being used to correct said non-functioning pixel.

6. A method of real-time correction of non-functioning pixels in digital radiography according to claim 5 wherein if a plurality of functioning, non-corrected pixels are in neighboring positions to the corresponding non-functioning pixel, then a plurality of said functioning, non-corrected pixels are used to correct said non-functioning pixel.

7. A method of real-time correction of non-functioning pixels in digital radiography according to claim 1 wherein said method is performed in parallel by a plurality of processors, each receiving a partial list of the non-functioning pixels.

8. A method of real-time correction of non-functioning pixels in digital radiography according to claim 1 wherein said correcting further comprises pre-fetching data of neighboring functioning pixels and corresponding non-functioning pixels within one of said plurality of groups and placing said pre-fetched information in a cache memory before correction thereof.

9. A method of real-time correction of non-functioning pixels in digital radiography according to claim 1 wherein said method further comprises ordering said list of non-functioning pixels by increasing memory address of said non-functioning pixels.

10. A method of real-time correction of non-functioning pixels in digital radiography, the method comprising: using a processor to perform the steps of
    receiving a list of non-functioning pixels;
    determining which neighboring functioning pixels are needed to correct said non-functioning pixels;

organizing said neighboring functioning pixels and corresponding non-functioning pixels into a plurality of groups based on a number of functioning pixels used to perform said correction of said non-functioning pixel within at least one of said plurality of groups;

combining at least one of said groups having a first number of pixels used to perform said correction with a group having a second number of pixels used to perform said correction to form a combined group, said second number being greater than said first number; and correcting data from said combined group of non-functioning pixels.

11. A computer-readable medium storing computer instructions for instructing a computer system to perform real-time correction of non-functioning pixels in digital radiography, the computer instructions comprising:

receiving a list of non-functioning pixels;

determining which neighboring functioning pixels are needed to correct said non-functioning pixels;

organizing said neighboring functioning pixels and corresponding non-functioning pixels into a plurality of groups based on a number of functioning pixels used to perform said correction of said non-functioning pixel within at least one of said plurality of groups; and correcting data from non-functioning pixels within one of said plurality of groups and subsequently correcting data from non-functioning pixels within another one of said plurality of groups.

12. The computer-readable medium according to claim 11 wherein said groups include a relative weight to be given to each of said neighboring functioning pixels in correcting the non-functioning pixels.

13. The computer-readable medium according to claim 11 wherein said correction is performed sequentially by grouping said non-functioning pixels in each of said plurality of groups.

14. The computer-readable medium according to claim 11 wherein said correction is performed for each image in a real-time image sequence.

15. The computer-readable medium according to claim 11 wherein said method step of determining which neighboring functioning pixels are needed to correct said non-functioning pixels further comprises determining that a functioning, non-corrected pixel is present in a neighboring position to a corresponding non-functioning pixel, said functioning, non-corrected pixel being used to correct said non-functioning pixel.

16. The computer-readable medium according to claim 15 wherein if a plurality of functioning, non-corrected pixels are in neighboring positions to the corresponding non-functioning pixel, then a plurality of said functioning, non-corrected pixels are used to correct said non-functioning pixel.

17. The computer-readable medium according to claim 11 wherein said method steps are performed in parallel by a plurality of processors, each receiving a partial list of the non-functioning pixels.

18. The computer-readable medium according to claim 11 wherein said correcting further comprises pre-fetching data of neighboring functioning pixels and corresponding non-functioning pixels within one of said plurality of groups and placing said pre-fetched information in a cache memory before correction thereof.

19. The computer-readable medium according to claim 11 wherein said method steps further comprise ordering said list of non-functioning pixels by increasing memory address of said non-functioning pixels.

20. A computer-readable medium storing computer instructions for instructing a computer system to perform real-time correction of non-functioning pixels in digital radiography, the computer instructions comprising:

receiving a list of non-functioning pixels;

determining which neighboring functioning pixels are needed to correct said non-functioning pixels;

organizing said neighboring functioning pixels and corresponding non-functioning pixels into a plurality of groups based on a number of functioning pixels used to perform said correction of said non-functioning pixel within at least one of said plurality of groups;

combining at least one of said groups having a first number of pixels used to perform said correction with a group having a second number of pixels used to perform said correction to form a combined group, said second number being greater than said first number; and correcting data from said combined group of non-functioning pixels.

* * * * *